United States Patent [19]
Evrard

[11] Patent Number: 5,857,562
[45] Date of Patent: Jan. 12, 1999

[54] PREFORM SUPPORT DEVICE

[75] Inventor: Alain Evrard, Le Havre, France

[73] Assignee: Sidel, Cedex, France

[21] Appl. No.: 860,956

[22] PCT Filed: Dec. 20, 1995

[86] PCT No.: PCT/FR95/01701

§ 371 Date: Jun. 20, 1997

§ 102(e) Date: Jun. 20, 1997

[87] PCT Pub. No.: WO96/19401

PCT Pub. Date: Jun. 27, 1996

[30] Foreign Application Priority Data

Dec. 22, 1994 [FR] France .................................. 94 15471

[51] Int. Cl.⁶ .................................................. B65G 17/06
[52] U.S. Cl. ................ 198/850; 198/867.09; 198/803.12
[58] Field of Search ......................... 198/803.12, 867.09, 198/850, 853

[56] References Cited

U.S. PATENT DOCUMENTS 2,646,160  7/1953  Michna .

FOREIGN PATENT DOCUMENTS 1403295  10/1965  France .
1452213  12/1966  France .

*Primary Examiner*—James R. Bidwell
*Attorney, Agent, or Firm*—Sughrue, Mion, Zinn, Macpeak & Seas, PLLC

[57] ABSTRACT

Device (1) for supporting a preform in an endless chain for conveying preforms that rotate simultaneously about themselves. The device comprises a plate (2) hingedly coupled to two adjacent plates and supporting a rod (5) removably fastened to the open end of a preform (8). The plate includes a linking stem portion (11) supporting a dome-shaped surface forming a coupling head (12) for contacting the associated adjacent plate, and a spherical seat portion (13) with a central axial opening (14) for the free passage of the linking stem portion (11) of the associated adjacent plate. The device is characterized in that the dome-shaped surface forming a coupling head is mounted free to rotate on said linking stem portion. A contact plate (16) is fastened to the free end of the linking stem portion (11) and extends transversely thereto substantially parallel to the side of the coupling head (12) opposite the side of the spherical cap. An annular bearing (17) is placed coaxial to the linking stem portion between the sides mutually opposite the coupling head (12) and the contact plate (16).

13 Claims, 3 Drawing Sheets

PREFORM SUPPORT DEVICE

BACKGROUND OF THE INVENTION

The present invention relates to improvements made to the preform support devices designed to be combined with a multiplicity of similar devices articulately coupled together one after another into an endless chain for transferring preforms with simultaneous rotation of the latter on themselves, this device including:

- a mounting plate provided with means of articulated coupling to two other adjacent mounting plates lying respectively to the front and to the rear (in the direction of movement of the chain);
- a body fixed to said mounting plate; and
- a rod supported by said body so as to rotate freely with the possibility of axial movement, said rod having a gripping end shaped in order to be removably fastened to the open end of a preform;

the abovementioned coupling means including:

- at a first end of the mounting plate, a linking stem supporting a spherical-cap-shaped coupling head intended to bear on the adjacent mounting plate lying on this first end side, and
- at a second end, a seat in the form of a spherical zone having a shape complementary to the abovementioned cap and provided with a central axial opening for the linking stem of the adjacent mounting plate, lying on this second end side, to pass through freely.

A preform transfer chain consisting of such devices is found especially in plants for manufacturing containers, such as bottles, flasks or the like, made of a plastic, especially a thermoplastic such as polyethylene terephthalate (PET). More particularly, a transfer chain formed in this way is used to move the preforms from a charging station up to and through a heating oven (tunnel oven) in which the material of which the preforms is made is heated in order subsequently to be molded, by a blow molding or stretch-blow molding process, into a large container (either the final container or an intermediate container). The transfer chain is furthermore designed so that the linear movement of the preforms is accompanied by a rotation of the preforms about themselves so that the material is heated uniformly all around the perimeter of the preforms, the heating means being arranged on one side in the oven.

FIG. 1 of the appended drawings represents, in diametral section, in a relatively detailed manner, a preform support device designed according to the usual technique, while FIG. 2 shows, from above, in a simplified form, the coupling parts (fraction of the transfer chain) of a group of three devices according to FIG. 1.

The preform support device, designated in its entirety by the reference 1, includes:

- a cavitied mounting plate 2 provided with means of articulated coupling to two other adjacent mounting plates lying respectively to the front and to the rear (in the direction (arrow 3) of movement of the transfer chain);
- a hollow body 4 fixed to the mounting plate 2; here, the body 4 consists of two parts, respectively an upper and a lower part, which are fixed in the mounting plate 2, for example, by screwing from above and from below the mounting plate, respectively;
- and a rod 5 supported so as to rotate freely in the hollow body 4; sleeves (shown, but not referenced) inside the body 4 guide the rod; furthermore, the rod is capable of being moved axially, with return by means of a spring 6.

At its free end (at the bottom in FIG. 1), the rod 5 is provided with a gripping head 7 designed to be removably or releasably fastened to the open end of a preform 8 (in the drawing, the gripping head 7 is frictionally pressed into the opening in the preform 8).

At its opposite end (at the top in FIG. 1), the rod 5 is fastened to a toothed wheel 9 capable of meshing with a link chain (of the sprocket chain type) which extends fixedly along the path followed by the transfer chain, by virtue of which the rod 5, and therefore the preform 8 which it supports, is rotated about itself when the transfer chain moves in the direction of the arrow 3.

The axial movement of the rod 5 is obtained by means of a cam (not shown) brought under the toothed wheel 9.

The multiplicity of preform support devices coupled together one after another forms an endless transfer chain 10 (a fragment of which is shown diagrammatically in FIG. 2) which has to have an ability to articulate, especially, but not exclusively, in a horizontal plane (as shown diagrammatically in FIG. 1). However, in addition, suitable execution of the process for manufacturing the containers requires that the preforms be positioned in different attitudes at various points in the transfer: in particular, they are loaded opening up onto the support devices 1 but must be heated opening down in the oven and then must be brought back opening up at the exit of the oven in order to be transferred into the mold. As a result, each support device 1 needs to be able to rotate independently of the flanking devices to the front and rear, about a horizontal axis, through the action of external guide cams.

For these purposes, it is known that the means of coupling each support device 1 to the two adjacent devices to the front and rear comprise:

- at the rear end of the mounting plate 2, a linking stem 11 supporting a spherical-cap-shaped coupling head 12, the spherical cap being, for example, convex with its convexity facing to the front, which is intended to bear on the adjacent mounting plate lying to the rear,
- at the front end of the mounting plate 2, a seat 13 in the form of a spherical zone having a shape complementary to the spherical cap, for example concave, and provided with a central axial opening 14 for the linking stem 11 of the adjacent it mounting plate, lying to the front, to pass through freely, the convex spherical cap of which bears on said concave seat.

This known arrangement has certain drawbacks inherent in the structure adopted.

First of all, the spherical articulation thus formed bears, just by itself, the tensile forces during the movement of the transfer chain, as well as the frictional forces generated during the rotation of the mounting plates with respect to one another, both in the bends in the transfer chain and when inverting the position of the preforms. Admittedly, the seats 13 are coated with a layer of self-lubricating material having a low coefficient of friction, such as TEFLON, but, given the magnitude of the forces which are exerted and the high speeds at which the mounting plates are moving with respect to one another, this layer is rapidly worn away and the seats 13 must be refurbished.

Here too there is a problem since access to the seats, for the purpose of repairing them and/or replacing them, requires unfastening the coupled mounting plates. As shown in FIG. 2, each linking stem 11 has its end provided with a thread and the coupling head 12 is locked onto the linking stem 11 by means of a nut 15. Access to the nuts 15 is tight and inconvenient. In general, maintenance of the coupling means requires interrupting the operation of the plant which proves to be lengthy, given the difficulties in disconnecting and reconnecting, and which is therefore expensive because of the corresponding loss of production. There therefore exists a pressing need on the part of users of plants incorporating such transfer chains for a structure which, while still keeping the same operating capabilities, proves to be less subject to wear and has a simpler structure making it easier to disconnect and reconnect, so as to reduce the overall cost inherent in maintaining the chain. Furthermore, the spacing between successive preforms, and therefore between successive mounting plates, is determined by the overall arrangement of the plant and has been reduced to a minimum in current plants: it is therefore necessary not to upset this overall arrangement and to see to it that the improvements to be made to the mounting plates fall within the constraints of the preexisting free spaces.

SUMMARY OF THE INVENTION

For these purposes, a preform support device as defined in the preamble is essentially characterized, being arranged in accordance with the invention, in that:

the spherical-cap-shaped coupling head is supported so as to rotate freely on the linking stem, a bearing plate is fastened, by fastening means, to the free end of the linking stem, this bearing plate extending transversely to the linking stem and substantially parallel to that face of the coupling head opposite its spherical-cap-shaped face, and an annular rolling bearing is interposed coaxially with the linking stem between the mutually facing faces of the coupling head and of the bearing plate.

Advantageously, the means for fastening the bearing plate onto the linking stem are designed for the purpose of retaining said bearing plate axially on said linking stem and comprise:

an axial recess of polygonal contour cut out in that face of the bearing plate opposite that carrying the rolling bearing, a radial groove cut out in the vicinity of the free end of the linking stem, and a retaining plate consisting of two parts joined together edge to edge along a transverse assembly edge, said retaining plate having a polygonal external contour complementary with that of the abovementioned recess and possessing a central orifice shaped to surround the linking stem, being engaged in the groove of the latter.

Advantageously also, for the purpose of obtaining optimum operation of the device, the means of fastening the bearing plate to the linking stem are designed for fastening said bearing plate rotationally to said linking stem and, for this purpose, the groove cut out in the linking stem possesses a polygonal contour and the contour of the central orifice of the retaining plate is itself also polygonal and complementary to that of the groove. Preferably, the contour of the groove of the linking stem is right-quadrangular, especially square.

By virtue of the arrangement in accordance with the invention, the two rotational articulations are physically separated:

the ability of the mounting plate to rotate about a horizontal axis is assigned to the rolling-bearing interface between the bearing plate and the coupling head;

the ability of the mounting plate to rotate in the parts where the transfer chain bends is reserved just for the spherical head.

The spherical head therefore no longer has to undergo the rotational movements of large angular amplitude (180°) inherent in turning the preforms over and only undergoes movements of relatively small angular amplitude: in this case, the layer of self-lubricating material covering the seats wears away considerably less quickly.

Moreover, in a preferred embodiment, the retaining plate includes an axial recess cut out in its face closest to the free end of the linking stem and shaped to accommodate the end of the linking stem extending beyond the abovementioned groove. Advantageously, the recess cut out in said face of the retaining plate has a right-quadrangular contour, especially a square one. In this case, it is beneficial for the end face of the linking stem, the aforementioned face of the bearing plate and the aforementioned face of the retaining plate to be approximately coplanar: an interlocking structure is thus formed which not only does not lead to elongation of the linking stem but may even allow a seat to be fitted which is slightly bulkier than the seat used hitherto and which consequently has an appreciably greater contact area, decreasing the pressure being exerted on the layer of self-lubricating material: by this means too, the rate of wear of the seat is substantially reduced.

Moreover, the simplified structure for assembling the parts onto the linking stem no longer involves screwing means but only parts which interlock, one into another: the disconnecting and reconnecting times are appreciably reduced.

Overall, the arrangement in accordance with the invention makes it possible to space out the times when operation of the transfer chain is stopped for maintenance purposes and to shorten the duration of these stoppages. The cost-effectiveness of the transfer chain is thus substantially improved without its technical characteristics and its mechanical reliability being diminished.

BRIEF DESCRIPTION OF THE FIGURES

The invention will be more clearly understood on reading the detailed description which follows of a preferred embodiment given solely by way of nonlimiting example. In this description, reference will be made to the appended drawings in which.

DETAILED DESCRIPTION OF THE PREFERRED

Figure 1:
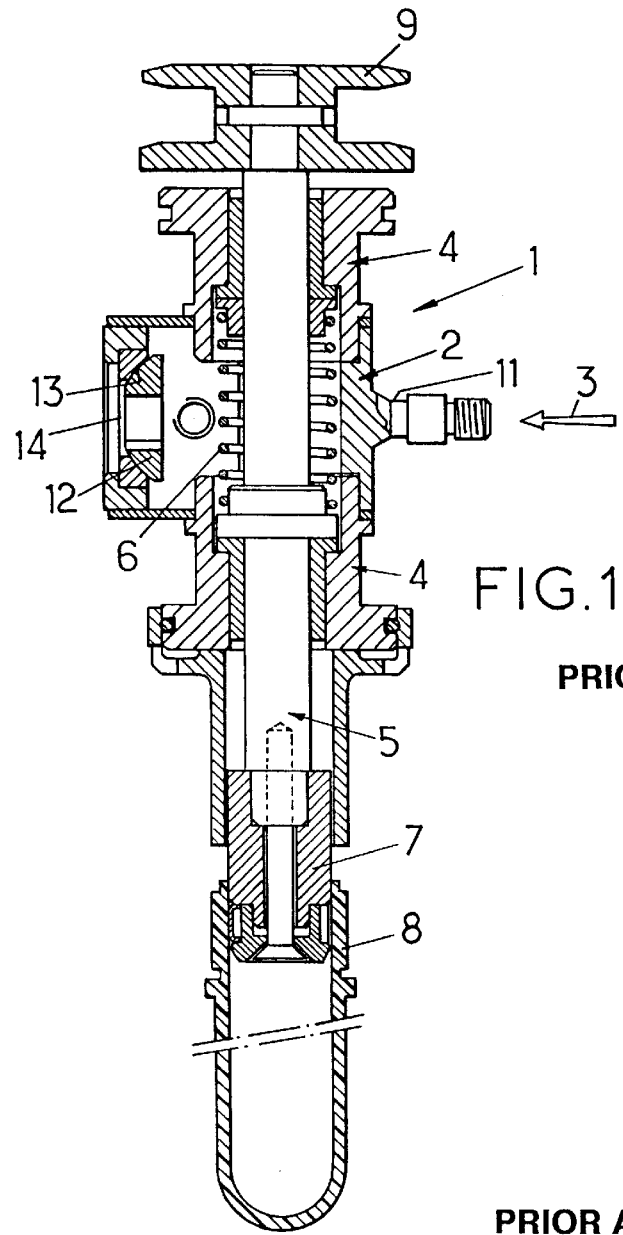
Figure 2:
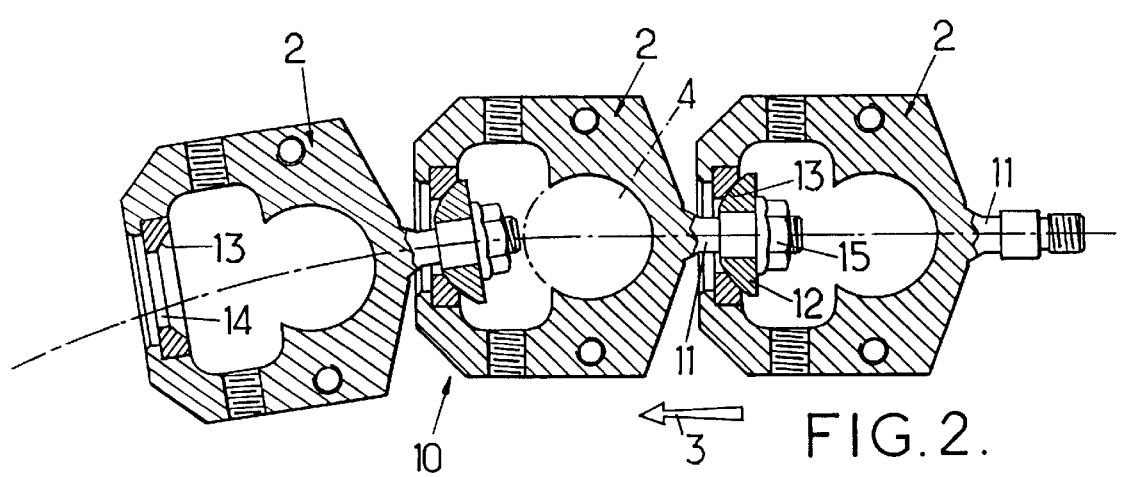
Figure 3:
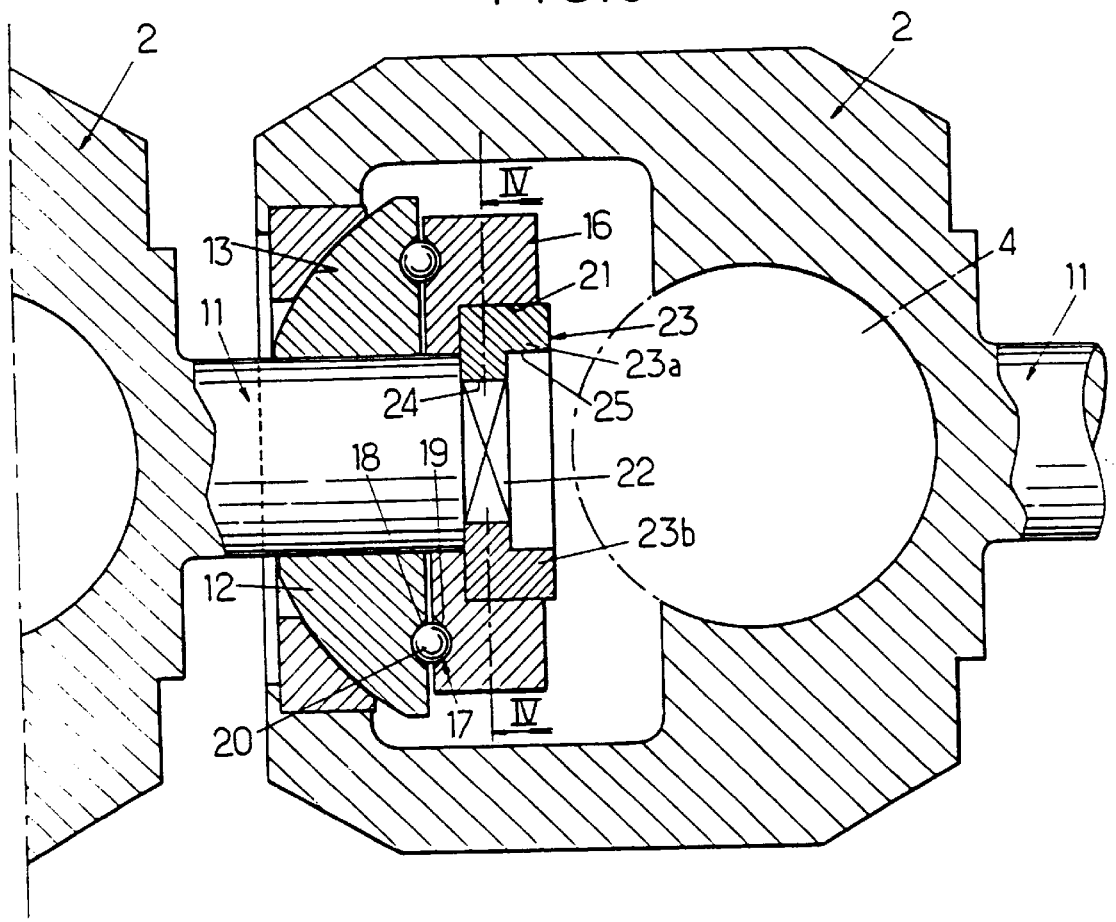
FIG. 3 is a diagrammatic view from above of a mounting plate for a preform support device which is designed in accordance with the invention.
Figure 4:
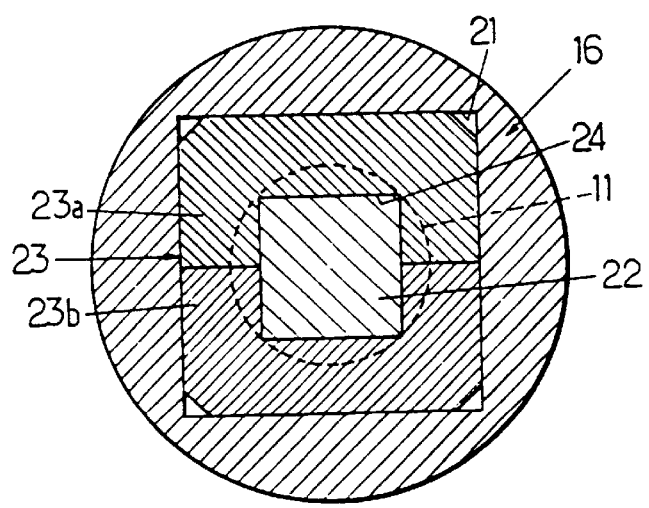
FIG. 4 is a sectional view along the arrow IV—IV in FIG. 3.

In FIGS. 3 and 4, the same reference numbers have been used to designate the elements or parts which are identical to those in FIGS. 1 and 2.

As may be seen in FIG. 3, the spherical-cap-shaped coupling head 12 is supported so as to rotate freely on a linking stem 11.

A bearing plate 16 is fastened to the free end of the linking stem 11. The bearing plate 16 extends substantially transversely to the linking stem 11 and substantially parallel to the substantially plane face of the coupling head 12 which lies on the rolling-bearing side.

An annular rolling bearing 17 is interposed between the mutually facing faces of the coupling head 12 and the bearing plate 16. This rolling bearing 17 may advantageously be constructed in a very compact form, in the axial direction of the linking stem 11, by providing two annular grooves 18 and 19, lying opposite each other and having the same diameter, cut out respectively in the facing faces of the coupling head 12 and the bearing plate 16. A multiplicity of balls 20 are held in said grooves, these being maintained approximately equidistant from one another, for example by virtue of spacers (not shown).

The bearing plate 16 is retained axially on the linking stem 11. For this purpose, that face of the bearing plate 16 opposite that carrying the rolling bearings is cut out to form a central axial recess 21 of polygonal, preferably right-quadrangular, especially square, contour.

A groove 22 is cut out radially in the linking stem 11, in the vicinity of the free end of the latter. This groove 22 may be discontinuous, but preferably it extends around the perimeter of the linking stem 11, as shown in FIG. 3.

A retaining plate 23 consists of two half-pieces 23a and 23b joined together edge to edge along a transverse assembly edge. This retaining plate 23 has a central orifice 24 shaped to surround the bottom of the groove 22 closely. The retaining plate 23 has a polygonal external contour which corresponds to the contour of the aforementioned recess 21, so as to be able to fit into the latter, this contour preferably being right-quadrangular, especially square, with cut-off corners as shown in FIG. 4.

Furthermore, in combination with the arrangements which have just been explained, provision is made for the bearing plate 16 to be rotationally fastened to the linking stem 11. For this purpose, the groove 22 cut out in the linking stem 11 extends over the entire perimeter of said stem and has a polygonal, preferably right-quadrangular, especially square, contour as can be clearly seen in FIG. 4. Likewise, the central orifice 24 of the two-part retaining plate 23 has a polygonal, preferably rectangular, especially square, contour.

Advantageously, as shown in FIG. 3, that face of the retaining plate 23 facing the free end of the linking stem is also cut out to form a central axial recess 25, shaped to accommodate the end of the linking stem 11 lying beyond the groove 22. Thus, the bearing plate 16, the retaining plate 23 and the end of the linking stem 11 fit together one inside the other and advantageously, in order to reduce as much as possible the overall size in the axial direction, it is possible to arrange for the end face of the linking stem, the aforementioned face of the bearing plate and the aforementioned face of the retaining plate to be approximately coplanar.

The arrangement which has just been described makes it possible to keep the same center-to-center spacing of the mounting plates as previously, and therefore without modifying the rest of the plant, while at the same time physically separating the function of articulation of the mounting plates, in order to follow the bends in the transfer chain, from the function of large-amplitude rotation about a horizontal axis. Without increasing the overall size of the means of coupling the mounting plates to one another, it becomes possible to increase the diameter of the linking stem substantially (an increase of the order of 50%), thereby commensurately increasing its tensile mechanical strength. At the same time it is also possible to increase the radius of curvature of the spherical head and of the seat, this increase possibly being approximately three times the radius previously adopted. As a result, there is an appreciable increase in the surface area of the seat and therefore, for a given tensile force, an appreciable reduction in the pressure exerted on the layer of self-lubricating material, with a considerably diminished wear thereof.

The mounting plates are joined together, one after another, in the following manner. First of all, each spherical coupling head 12 is joined to the corresponding bearing plate 16, with interposition of the rolling bearing 17, the assembly being temporarily held together by removable means (for example an adhesive tape). One of these assemblies is arranged inside a mounting plate 2 which is not equipped with the body 4 of the rod 5, and then the linking stem 11 of an adjacent mounting plate lying to the front is introduced through the assembly. The preceding mounting plate is butted up so that the free end of the linking stem projects beyond the bearing plate. The two half-parts 23a and 23b of the plate 23 are then pressed into the groove 22. The adjacent mounting plate, lying in front, is then moved forwards so that the retaining plate 23 fits into the recess 21 of the bearing plate and so that the convex spherical face bears against the concave seat 13, while the body 4 is mounted in the mounting plate. The small clearance existing between the mounted body 4 and the end face of the linking stem is sufficient to keep the two mounting plates coupled to each other.

Figure 5:
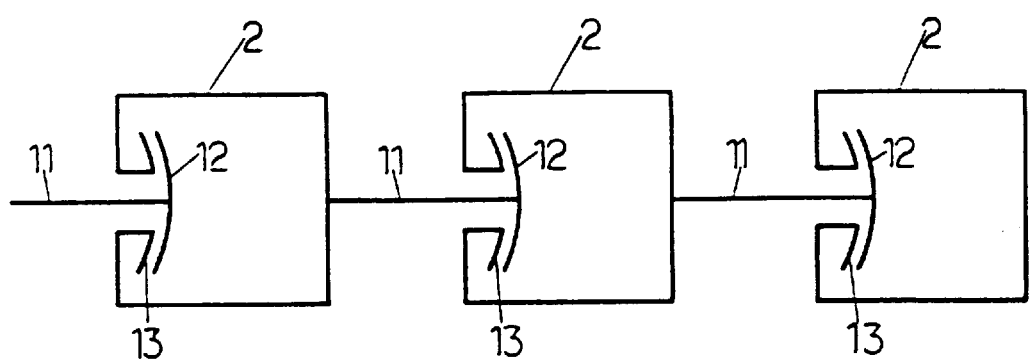
FIG. 5 is a highly diagrammatic view illustrating an alternative arrangement of the mounting plate.

As goes without saying and as already results from the foregoing, the invention is in no way limited to those of its methods of application and of its embodiments which have been more particularly envisaged; on the contrary, it encompasses all variants thereof. In particular, it will be understood that the arrangement shown in the drawings, with a coupling head 12 in the form of a convex spherical cap with its convexity facing the mounting plate and a seat 13 in the form of a complementary concave spherical zone, constitutes only one possible embodiment. The concavity and convexity may be reversed, positionally or directionally, without departing from the scope of the invention. This is because, in the arrangement in FIG. 3, the direction of movement of the chain may equally well be in one direction (for example to the left, the spherical cap 12 being the driving member) as in the other direction (respectively to the right, the seat of the mounting plate 2 being the driving member). Likewise, as shown highly diagrammatically in FIG. 5, the coupling head 12 may be shaped in the form of a concave spherical cap with its concavity facing the mounting plate, while the seat of the mounting plate is convex, with the same conditions of driving in one direction or in the other as above.

I claim:

1. A preform support device (1) designed to be combined with a multiplicity of similar devices articulately coupled together one after another into an endless chain for transferring preforms with simultaneous rotation thereof on themselves, said device comprising:

a) mounting plate (2) provided with means for articulately coupling to two other adjacent mounting plates lying respectively to the front and to the rear with respect to a direction (3) of movement of the chain;

b) a body (4) fixed to said mounting plate; and c) a rod (5) supported by said body so as to rotate freely with the possibility of axial movement, said rod having a gripping end (7) shaped in order to be removably fastened to the open end of a preform (8);

d) the coupling means including,
   at a first end of the mounting plate, a linking stem (11) supporting a spherical, cap-shaped coupling head (12) intended to bear on an adjacent mounting plate lying on said first end side, and at a second end, a seat (13) in the form of a spherical zone having a shape complementary to the coupling head and provided with a central axial opening (14) for the linking stem of the adjacent mounting plate, lying on said second end side, to pass through freely, e) wherein:
  i) a the spherical, cap-shaped coupling head is supported so as to rotate freely on the linking stem,
  ii) a bearing plate (16) is fastened, by fastening means, to a free end of the linking stem, said bearing plate extending transversely to the linking stem and substantially parallel to a face of the coupling head opposite a spherical cap-shaped face thereof, and
  iii) an annular rolling bearing (17) is interposed coaxially with the linking stem between the mutually facing faces of the coupling head and the bearing plate.

2. A device according to claim 1, wherein the first end of the mounting plate is its rear end with respect to the direction of movement of the chain and the second end is its front end.

3. A device according to claim 1, wherein the first end of the mounting plate is its front end with respect to the direction of movement of the chain and the second end is its rear end.

4. A device according to claim 1, wherein the means for fastening the bearing plate onto the linking stem are designed for the purpose of retaining said bearing plate axially on said linking stem, and comprise:
  a an axial recess (21) of polygonal contour cut out in a face of the bearing plate opposite that carrying the rolling bearing,
  b) a radial groove (22) cut out in the vicinity of the free end of the linking stem, and
  c) a retaining plate (23) having two parts (23a, 23b) joined together edge to edge along a transverse assembly edge, said retaining plate having a polygonal external contour complementary with that of the axial recess and defining a central orifice (24) shaped to surround the linking stem, and engaged in the groove thereof.

5. A device according to claim 4, wherein the means of fastening the bearing plate to the linking stem are designed for fastening said bearing plate rotationally to said linking stem, and wherein, for such purpose, the groove cut out in the linking stem has a polygonal contour of the central orifice of the retaining plate is also polygonal and complementary to that of the groove.

6. A device according to claim 5, wherein the contour of the groove (22) of the linking stem is right-quadrangular.

7. A device according to claim 6, wherein the contour of the groove (22) of the linking stem is square.

8. A device according to claim 4 the retaining plate includes an axial recess (25) cut out in a face thereof closest to the free end of the linking stem and shaped to accommodate an end of the linking stem extending beyond the abovementioned groove.

9. A device according to claim 8, wherein the recess cut out in the face of the retaining plate has a right-quadrangular contour.

10. A device according to claim 9, wherein said recess (25) has a square contour.

11. A device according to claim 5, wherein the end face of the linking stem the face of the bearing plate opposite the rolling bearing, and face of the retaining plate closest to the free end of the linking stem are approximately coplanar.

12. A device according to claim 1 wherein the annular rolling bearing comprises two annular grooves (18, 19) facing each other, cut out respectively in the mutually facing faces of the coupling head and the bearing plate, and a multiplicity of ball bearings (20) housed in said grooves and maintained approximately equidistant from one another.

13. A device according to claim 1 wherein the coupling head is in the form of a spherical cap with its convexity facing the mounting plate, and the seat is in the form of a concave spherical zone.

* * * * *